United States Patent
Ramanathan et al.

(10) Patent No.: US 12,248,490 B2
(45) Date of Patent: Mar. 11, 2025

(54) SYSTEM AND METHOD FOR RANKING OF DATABASE TABLES FOR USE WITH EXTRACT, TRANSFORM, LOAD PROCESSES

(71) Applicant: ORACLE INTERNATIONAL CORPORATION, Redwood Shores, CA (US)

(72) Inventors: Krishnan Ramanathan, Bengaluru (IN); Aman Madaan, Pittsburgh, PA (US); Somashekhar Pammar, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/076,164

(22) Filed: Oct. 21, 2020

(65) Prior Publication Data
US 2021/0049183 A1    Feb. 18, 2021

Related U.S. Application Data

(63) Continuation-in-part of application No. 16/851,869, filed on Apr. 17, 2020, now Pat. No. 11,803,798.

(30) Foreign Application Priority Data

Apr. 18, 2019  (IN) .............................. 201941015571
Apr. 18, 2019  (IN) .............................. 201941015572
(Continued)

(51) Int. Cl.
G06F 16/25   (2019.01)
G06F 16/22   (2019.01)
(Continued)

(52) U.S. Cl.
CPC ........ *G06F 16/254* (2019.01); *G06F 16/2282* (2019.01); *G06F 16/24578* (2019.01); *G06F 16/283* (2019.01)

(58) Field of Classification Search
CPC .............. G06F 16/254; G06F 16/2282; G06F 16/24578; G06F 16/283
See application file for complete search history.

(56) References Cited

U.S. PATENT DOCUMENTS 7,058,615 B2   6/2006  Yao
7,151,438 B1  12/2006  Hall
(Continued)

FOREIGN PATENT DOCUMENTS

| | | |
|---|---|---|
| EP | 3352103 | 7/2018 |
| JP | 2003529119 | 9/2003 |
| JP | 2009146350 | 7/2009 |

OTHER PUBLICATIONS

"Cross-tenant analytics using extracted data—multi-tenant app", retrieved from https://docs.microsoft.com/en-us/azure/sql-database/saas-tenancy-tenant-analytics on Dec. 5, 2019, 12 pages.
(Continued)

*Primary Examiner* — Albert M Phillips, III
*Assistant Examiner* — Courtney Harmon
(74) *Attorney, Agent, or Firm* — TUCKER ELLIS LLP

(57) ABSTRACT

In accordance with various embodiments, described herein are systems and methods for use with an analytic applications environment, for ranking of database tables for use in controlling extract, transform, load (ETL) processes. In accordance with an embodiment, the system uses a ranking algorithm or process to rank database tables and/or table columns associated with a set of data. The table/column rankings can then be used to prioritize ETL processing of a customer's data for use with a data warehouse or other data analytics environment. In accordance with an embodiment,
(Continued)

the method includes determining a global rank; a business rank; and a tenant or customer-specific rank, for a plurality of tables and columns in a customer's database; and aggregating or otherwise using the determined rankings to control the ETL process for a particular customer (tenant), to load their data into the data warehouse.

20 Claims, 12 Drawing Sheets

(30) Foreign Application Priority Data

Apr. 18, 2019 (IN) .............................. 201941015582
Apr. 18, 2019 (IN) .............................. 201941015583

(51) Int. Cl.
  *G06F 16/2457* (2019.01)
  *G06F 16/28* (2019.01)

(56) References Cited

U.S. PATENT DOCUMENTS

| | | |
|---|---|---|
| 7,739,292 B2 | 6/2010 | Falk |
| 7,974,896 B2 | 7/2011 | Busse |
| 8,010,426 B2 | 8/2011 | Kopp |
| 8,150,744 B2 | 4/2012 | Zoldi |
| 8,386,419 B2 | 2/2013 | Yalamanchilli |
| 8,543,535 B2 | 9/2013 | Satpathy |
| 8,554,801 B2 | 10/2013 | Mack |
| 8,719,769 B2 | 5/2014 | Castellanos |
| 8,775,372 B2 | 7/2014 | Dary |
| 8,799,209 B2 | 8/2014 | Bakalash |
| 8,983,914 B2 | 3/2015 | Kung |
| 9,152,662 B2 | 10/2015 | Bhide |
| 9,239,996 B2 | 1/2016 | Moorthi |
| 9,244,951 B2 | 1/2016 | Mandelstein |
| 9,355,145 B2 | 5/2016 | George |
| 9,430,505 B2 | 8/2016 | Padmanabhan |
| 9,442,993 B2 | 9/2016 | Tung |
| 9,460,188 B2 | 10/2016 | Mundlapudi et al. |
| 9,483,537 B1 | 11/2016 | Peters |
| 9,509,571 B1 | 11/2016 | Liu |
| 9,619,535 B1* | 4/2017 | Kapoor ................. G06F 16/254 |
| 9,633,095 B2 | 4/2017 | Mehra |
| 9,870,629 B2 | 1/2018 | Cardno |
| 9,904,706 B2 | 2/2018 | Bhattacharjee |
| 9,922,104 B1 | 3/2018 | Kapoor |
| 9,961,011 B2 | 5/2018 | Mordani |
| 9,971,819 B2 | 5/2018 | Bender |
| 10,019,451 B2 | 7/2018 | Preslan |
| 10,055,431 B2 | 8/2018 | Marrelli et al. |
| 10,078,676 B2 | 9/2018 | Bhagat |
| 10,108,683 B2 | 10/2018 | Dhayapule |
| 10,110,390 B1 | 10/2018 | Nguyen |
| 10,191,802 B2 | 1/2019 | Nautiyal |
| 10,206,770 B2 | 2/2019 | Seng |
| 10,275,409 B2 | 4/2019 | Tung |
| 10,324,932 B2 | 6/2019 | Gordon |
| 10,423,639 B1 | 9/2019 | Kapoor |
| 10,423,688 B1 | 9/2019 | Patton |
| 10,437,846 B2 | 10/2019 | Venkatasubramanian |
| 10,552,443 B1 | 2/2020 | Wu |
| 10,572,679 B2 | 2/2020 | Frank |
| 10,620,923 B2 | 4/2020 | Allan |
| 10,635,686 B2 | 4/2020 | Wan |
| 10,664,321 B2 | 5/2020 | Reddipalli |
| 10,685,033 B1 | 6/2020 | Searls |
| 10,762,086 B2 | 9/2020 | Wu |
| 10,795,895 B1* | 10/2020 | Taig .................. G06F 16/24578 |
| 10,860,562 B1 | 12/2020 | Gupta |
| 10,866,938 B2 | 12/2020 | Gupta |
| 10,936,614 B2 | 3/2021 | Kumar |
| 10,970,303 B1 | 4/2021 | Denton |
| 10,997,129 B1 | 5/2021 | Nanda |
| 11,106,508 B2 | 8/2021 | Calhoun |
| 11,190,599 B2 | 11/2021 | Greenstein |
| 11,194,795 B2 | 12/2021 | Muralidhar |
| 11,194,813 B2 | 12/2021 | Johnson, III |
| 11,321,290 B2 | 5/2022 | Yan |
| 11,367,034 B2 | 6/2022 | Chintalapati |
| 11,436,259 B2 | 9/2022 | Chawla |
| 11,614,976 B2 | 3/2023 | Ramanathan |
| 11,640,406 B2 | 5/2023 | Reinshagen |
| 2002/0178077 A1 | 11/2002 | Katz |
| 2004/0215584 A1 | 10/2004 | Yao |
| 2006/0195492 A1 | 8/2006 | Clark |
| 2007/0073712 A1 | 3/2007 | Falk |
| 2008/0162509 A1 | 7/2008 | Becker |
| 2008/0195430 A1 | 8/2008 | Rustagi |
| 2008/0250057 A1 | 10/2008 | Rothstein et al. |
| 2009/0076866 A1* | 3/2009 | Zoldi .................... G06Q 40/12 |
| | | 705/35 |
| 2009/0319544 A1 | 12/2009 | Griffin |
| 2010/0057548 A1* | 3/2010 | Edwards ............ G06Q 30/0211 |
| | | 705/14.13 |
| 2010/0280990 A1 | 11/2010 | Castellanos |
| 2011/0047525 A1 | 2/2011 | Castellanos |
| 2011/0055231 A1 | 3/2011 | Huck |
| 2011/0113467 A1 | 5/2011 | Agarwal |
| 2011/0208692 A1 | 8/2011 | Satpathy |
| 2011/0231454 A1* | 9/2011 | Mack .................... G06F 16/258 |
| | | 707/803 |
| 2011/0261049 A1* | 10/2011 | Cardno .................. G06Q 40/04 |
| | | 345/419 |
| 2011/0295793 A1 | 12/2011 | Venkatasubramanian |
| 2011/0295795 A1 | 12/2011 | Venkatasubramanian |
| 2012/0089564 A1 | 4/2012 | Bakalash |
| 2012/0131591 A1 | 5/2012 | Moorthi |
| 2012/0191642 A1 | 7/2012 | George |
| 2012/0232950 A1 | 9/2012 | Kadkol |
| 2012/0310875 A1 | 12/2012 | Prahlad |
| 2013/0086121 A1* | 4/2013 | Preslan .................. G06F 16/13 |
| | | 707/E17.055 |
| 2013/0086134 A1 | 4/2013 | Doughan |
| 2013/0166515 A1 | 6/2013 | Kung |
| 2013/0185309 A1* | 7/2013 | Bhide .................... G06Q 10/06 |
| | | 707/748 |
| 2013/0191306 A1 | 7/2013 | Wilkinson |
| 2013/0238641 A1 | 9/2013 | Mandelstein |
| 2013/0332226 A1 | 12/2013 | Nair |
| 2014/0007190 A1 | 1/2014 | Alperovitch |
| 2014/0075032 A1 | 3/2014 | Vasudevan |
| 2014/0164033 A1 | 6/2014 | Baskaran et al. |
| 2014/0229511 A1 | 8/2014 | Tung |
| 2014/0349272 A1 | 11/2014 | Kutty |
| 2015/0033217 A1 | 1/2015 | Mellor |
| 2015/0186481 A1 | 7/2015 | Mehra |
| 2015/0207758 A1 | 7/2015 | Mordani |
| 2015/0213470 A1 | 7/2015 | Rush |
| 2015/0256475 A1 | 9/2015 | Suman |
| 2016/0092059 A1* | 3/2016 | Tu ......................... G06F 16/252 |
| | | 715/738 |
| 2016/0224803 A1 | 8/2016 | Frank |
| 2016/0292192 A1 | 10/2016 | Bhagat |
| 2016/0292216 A1 | 10/2016 | Joshi |
| 2016/0306827 A1 | 10/2016 | Dos Santos |
| 2016/0314175 A1 | 10/2016 | Dhayapule |
| 2016/0328566 A1 | 11/2016 | Nellamakkada |
| 2017/0004187 A1 | 1/2017 | Tung |
| 2017/0006135 A1 | 1/2017 | Siebel |
| 2017/0011087 A1 | 1/2017 | Hyde |
| 2017/0068595 A1 | 3/2017 | Nautiyal |
| 2017/0104627 A1 | 4/2017 | Bender |
| 2017/0116295 A1 | 4/2017 | Wan |
| 2017/0161344 A1 | 6/2017 | Vasireddy |
| 2017/0249361 A1 | 8/2017 | Gordon |
| 2018/0032550 A1 | 2/2018 | Gupta |
| 2018/0052898 A1 | 2/2018 | Allan |
| 2018/0060400 A1 | 3/2018 | Wu |
| 2018/0060402 A1 | 3/2018 | Fabjanski |
| 2018/0150529 A1 | 5/2018 | McPherson |
| 2018/0167370 A1 | 6/2018 | Frahim |

(56) References Cited

U.S. PATENT DOCUMENTS

| | | |
|---|---|---|
| 2018/0329966 A1 | 11/2018 | Ranganathan |
| 2019/0042322 A1 | 2/2019 | Calhoun |
| 2019/0114211 A1 | 4/2019 | Reddipalli |
| 2019/0287006 A1* | 9/2019 | Costabello ............. G06N 5/045 |
| 2019/0294596 A1 | 9/2019 | Yan |
| 2019/0317972 A1 | 10/2019 | Patton |
| 2020/0004863 A1 | 1/2020 | Kumar |
| 2020/0007631 A1 | 1/2020 | Greenstein |
| 2020/0012647 A1 | 1/2020 | Johnson, III |
| 2020/0081991 A1 | 3/2020 | Caputo |
| 2020/0104775 A1 | 4/2020 | Chintalapati |
| 2020/0334089 A1 | 10/2020 | Ramanathan |
| 2020/0334240 A1 | 10/2020 | Muralidhar |
| 2020/0334267 A1 | 10/2020 | Ramanathan |
| 2020/0334268 A1 | 10/2020 | Vasireddy |
| 2020/0334270 A1 | 10/2020 | Vasireddy |
| 2020/0334271 A1 | 10/2020 | Ramanathan |
| 2020/0334608 A1 | 10/2020 | Ramanathan |
| 2020/0349155 A1 | 11/2020 | Reinshagen |
| 2021/0049183 A1 | 2/2021 | Ramanathan |
| 2021/0342341 A1* | 11/2021 | Fujimaki ............. G06F 16/2453 |

OTHER PUBLICATIONS

Kim, et al., "A Component-Based Architecture for Preparing Data in Data Warehousing", retrieved from https://www.researchgate.net/profile/Eui_Hong2/publication/2466873_A_Component-Based_Architecture_for_Preparing_Data_in_Data_Warehousing/links/541be8930cf25ebee98dac5c/A-Component-Based-Architecture-for-Preparing-Data-in-Data-Warehousing.pdf on Dec. 5, 2019, 8 pages.

Subash, Muthiah; "An Approach to Multi-Tenant Customer Data Isolation Using SQL Server and Tableau 8.1", Credera, published Jun. 18, 2014, retrieved from https://www.credera.com/insights/approach-multi-tenant-customer-data-isolation-using-sql-server-tableau-8-1/, 12 pages.

United States Patent and Trademark Office, Office Communication dated Sep. 21, 2021 for U.S. Appl. No. 16/852,070, 17 pages.

United States Patent and Trademark Office, Office Communication dated Feb. 22, 2022 for U.S. Appl. No. 16/852,070, 22 pages.

United States Patent and Trademark Office, Notice of Allowance and Fee(s) Due dated Jul. 20, 2022 for U.S. Appl. No. 16/852,070, 10 pages.

United States Patent and Trademark Office, Office Communication dated May 11, 2022 for U.S. Appl. No. 16/862,394, 19 pages.

United States Patent and Trademark Office, Notice of Allowance and Fee(s) Due dated Sep. 2, 2022 for U.S. Appl. No. 16/862,394, 9 pages.

United States Patent and Trademark Office, Notice of Allowance and Fee(s) Due dated Dec. 29, 2022 for U.S. Appl. No. 16/862,394, 8 pages.

United States Patent and Trademark Office, Office Communication dated Aug. 19, 2021 for U.S. Appl. No. 16/862,394, 15 pages.

European Patent Office, Notification of Transmittal of the International Search Report and the Written Opinion of the International Searching Authority, or the Declaration dated Jul. 6, 2020 for International Patent Application No. PCT/US2020/030547, 11 pages.

United States Patent and Trademark Office, Office Communication dated Sep. 15, 2023 for U.S. Appl. No. 17/883,471, 6 pages.

United States Patent and Trademark Office, Office Communication dated Mar. 3, 2022 for U.S. Appl. No. 16/868,081, 10 pages.

United States Patent and Trademark Office, Office Communication dated Dec. 8, 2022 for U.S. Appl. No. 16/868,081, 14 pages.

United States Patent and Trademark Office, Notice of Allowance and Fee(s) Due dated Jul. 26, 2023 for U.S. Appl. No. 16/851,869, 9 pages.

United States Patent and Trademark Office, Notice of Allowance and Fee(s) Due dated Dec. 13, 2022 for U.S. Appl. No. 16/853,428, 10 pages.

United States Patent and Trademark Office, Office Communication dated Jun. 17, 2022 for U.S. Appl. No. 16/853,428, 21 pages.

United States Patent and Trademark Office, Office Communication dated Dec. 9, 2021 for U.S. Appl. No. 16/851,872, 21 pages.

United States Patent and Trademark Office, Office Communication dated Jun. 27, 2022 for U.S. Appl. No. 16/851,872, 29 pages.

United States Patent and Trademark Office, Office Communication dated Mar. 13, 2023 for U.S. Appl. No. 16/851,872, 29 pages.

United States Patent and Trademark Office, Office Communication dated Jun. 8, 2022 for U.S. Appl. No. 16/920,574, 14 pages.

United States Patent and Trademark Office, Office Communication dated Aug. 23, 2023 for U.S. Appl. No. 16/920,574, 16 pages.

Dageville, Benoit et al., "The Snowflake Elastic Data Warehouse" Snowflake Computing; ACM 2016, SIGMOD/PODS 16 Jun. 26-Jul. 1, 2016, San Francisco, CA, ©2016, pp. 215-226.

Ganapathi, Archana et al., "Statistics-Driven Workload Modeling for the Cloud", ICDE Workshops 2010, ©2010 IEEE, pp. 87-92.

Tu, Yingying and Guo Chaozhen "An Intelligent ETL Workflow Framework based on data Partition", IEEE 2010, ©2010, pp. 358-363.

"Cross-tenant analytics using extracted data—single-tenant app", published Dec. 18, 2018, retrieved from https://docs.microsoft.com/en-us/azure/sql-database/saas-tenancy-tenant-analytics on Dec. 5, 2019, 15 pages.

Gawande, Sandesh; "ETL Strategy for the Enterprise: ETL Strategy to store data validation rules", ETLGuru, retrieved from <http://etlguru.com/?p=22> on Nov. 27, 2019, 2 pages.

Homayouni, Hajar; "An Approach for Testing the Extract-Transform-Load Process in Data Warehouse Systems", Thesis, Fall 2017, Colorado State University, 96 pages.

Pcs, The Chartered Institute for IT, "Making cloud ETL routines work", The Chartered Institute for IT, published Sep. 6, 2017, retrieved from <https://www.bcs.org/content-hub/making-cloud-etl-routines-work/> on Dec. 5, 2019, 4 pages.

Ong, et al., "Dynamic-ETL: a hybrid approach for health data extraction, transformation and loading", published on Sep. 13, 2017, retrieved from <https://www.ncbi.nlm.nih.gov/pmc/articles/PMC5598056/> on Nov. 27, 2019, 10 pages.

Domingues, Marcos Aurelio, "An Independent Platform for the Monitoring, Analysis and Adaptation of Web Sites", Proceedings of the 2008 SCM conference on Recommender systems, Oct. 2008, pp. 299-302.

"Use Power BI with SQL Data Warehouse", Engineering ME366, Boston University Academy, retrieved from <https://www.coursehero.com/file/p25tovsh/Scored-Labels-the-classification-done-by-the-model-bike-buyer-1-or-not-0-This/> on Nov. 27, 2019, 1 page.

Oracle, "Fusion Middleware Developing Integration Projects with Oracle Data Integrator 12c (12.2.1.1)", May 2016, 340 pages.

Oracle, "Fusion Middleware Developing Integration Projects with Oracle Data Integrator—Overview of Oracle Data Integrator Topology", 4 pages, retrieved on Oct. 20, 2022 from: <https://docs.oracle.com/middleware/12211/odi/develop/setup_topology.htm#ODIDG171>.

Datagaps, "Etl Validator: Key Features", retrieved from <https://www.datagaps.com/etl-testing-tools/etl-validator/> on Nov. 27, 2019, 2 pages.

Schneider, Erich et al., "SAP HANA® Platform—Technical Overview: Driving Innovations in IT and in Business with In-Memory Computing Technology", Feb. 21, 2012, 20 pages.

Albrecht, Alexander and Naumann, Felix; "Managing ETL Processes" VLDB '08, Aug. 24-30, 2008, Auckland, New Zealand, ©2008 VLDB Endowment, ACM, 4 pages.

Shukla, Anshu; Chaturvedi, Shilpa and Simmhan, Yogesh "RIotBench: A Real-time IoT Benchmark for Distributed Stream Processing Platforms", 34 pages, Jan. 2017, <https://arxiv.org/abs/1701.08530v1>.

Ramesh, S. M. and Gomathy, B. "Review on Scheduling Algorithms for Data Warehousing" International Journal of Science and Research (IJSR), vol. 3 Issue 9, Sep. 2014, 6 pages.

European Patent Office, Communication pursuant to Article 94(3) EPC dated Apr. 26, 2024 for European Patent Application No. 20727046.3, 7 pages.

(56) References Cited

OTHER PUBLICATIONS

Japan Patent Office, Notice of Reasons for Refusal dated Jun. 13, 2024 for Japanese Patent Application No. 2021-551582 , 12 pages.
Japan Patent Office, Notice of Reasons for Refusal dated Jun. 12, 2024 for Japanese Patent Application No. 2021-551572 , 6 pages.

* cited by examiner

SYSTEM AND METHOD FOR RANKING OF DATABASE TABLES FOR USE WITH EXTRACT, TRANSFORM, LOAD PROCESSES

CLAIM OF PRIORITY AND CROSS-REFERENCE TO RELATED APPLICATIONS

This application is a continuation-in-part of U.S. Patent Application titled "SYSTEM AND METHOD FOR AUTOMATIC GENERATION OF EXTRACT, TRANSFORM, LOAD (ETL) ASSERTS", application Ser. No. 16/851,869, filed Apr. 17, 2020; which application claims the benefit of priority to India Provisional Patent Application titled "SYSTEM AND METHOD FOR AUTOMATIC GENERATION OF EXTRACT, TRANSFORM, LOAD (ETL) ASSERTS", Application No. 201941015571, filed Apr. 18, 2019; India Provisional Patent Application titled "SYSTEM AND METHOD FOR RANKING OF EXTRACT, TRANSFORM, LOAD (ETL) ALERTS", Application No. 201941015572, filed Apr. 18, 2019; India Provisional Patent Application titled "SYSTEM AND METHOD FOR OPTIMIZATION OF VIRTUAL MACHINES FOR EXTRACT, TRANSFORM, LOAD (ETL)", Application No. 201941015582, filed Apr. 18, 2019; and India Provisional Patent Application titled "SYSTEM AND METHOD FOR DETERMINATION OF RECOMMENDATIONS AND ALERTS IN AN ANALYTICS ENVIRONMENT", Application No. 201941015583, filed Apr. 18, 2019; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and systems and methods for use with an analytic applications environment, for ranking of database tables for use in controlling extract, transform, load (ETL) processes.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

A cloud-based computing environment or data warehouse enables extract, transform, load (ETL) processes to be performed for multiple customers, using the shared resources of the cloud or data warehouse environment. In such environments, the various ETL processes may be associated with customer service level agreements (SLA's) specified for different customers. However, since a customer's data growth may not be linear, or may otherwise vary over time; it can be challenging to ensure that the ETL processing time associated with their data remains within their associated SLA.

SUMMARY

In accordance with various embodiments, described herein are systems and methods for use with an analytic applications environment, for ranking of database tables for use in controlling extract, transform, load (ETL) processes. In accordance with an embodiment, the system uses a ranking algorithm or process to rank database tables and/or table columns associated with a set of data. The table/column rankings can then be used to prioritize ETL processing of a customer's data for use with a data warehouse or other data analytics environment. In accordance with an embodiment, the method includes determining a global rank; a business rank; and a tenant or customer-specific rank, for a plurality of tables and columns in a customer's database; and aggregating or otherwise using the determined rankings to control the ETL process for a particular customer (tenant), to load their data into the data warehouse.

DETAILED DESCRIPTION

Figure 1:
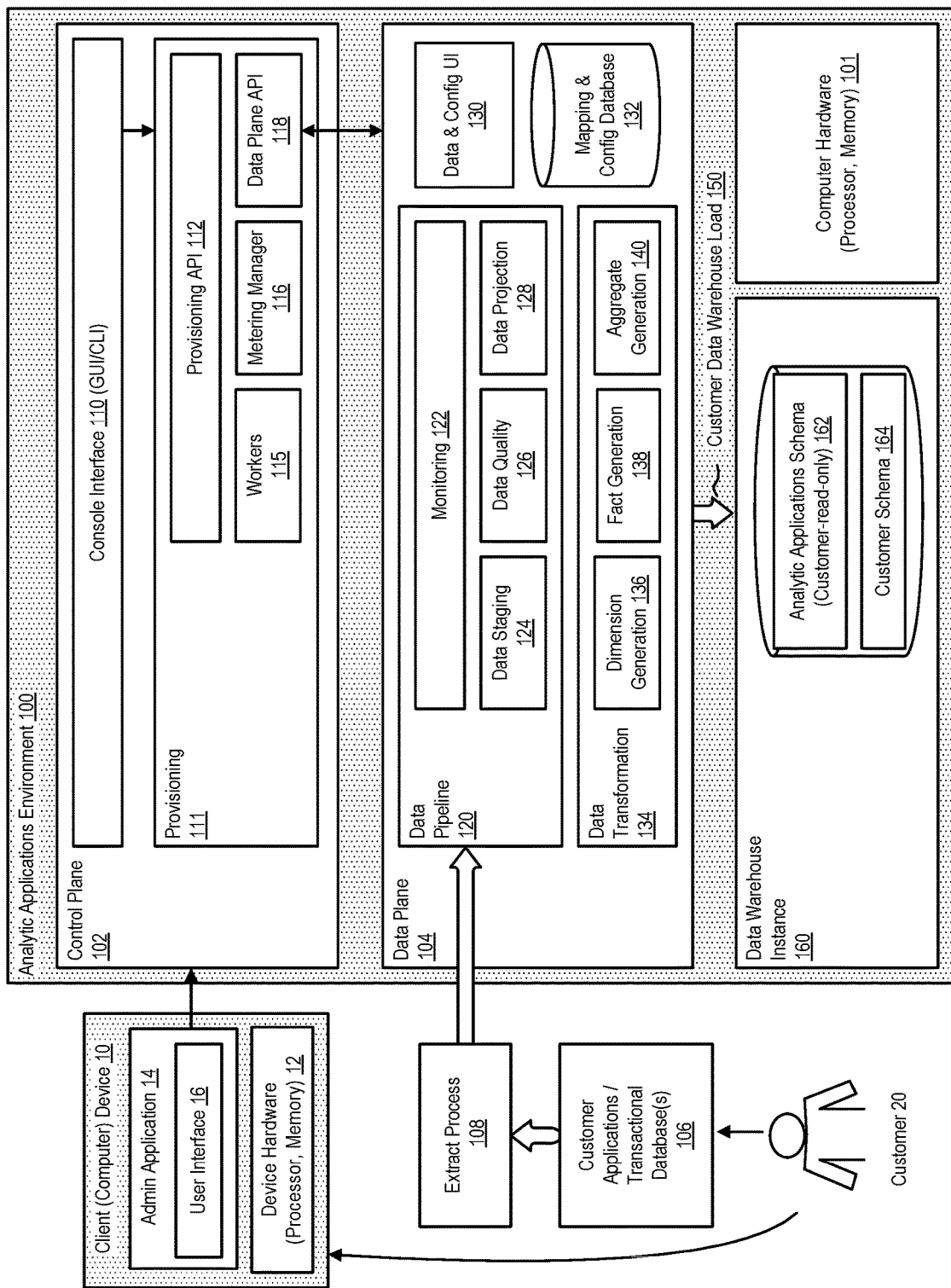
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

INTRODUCTION

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
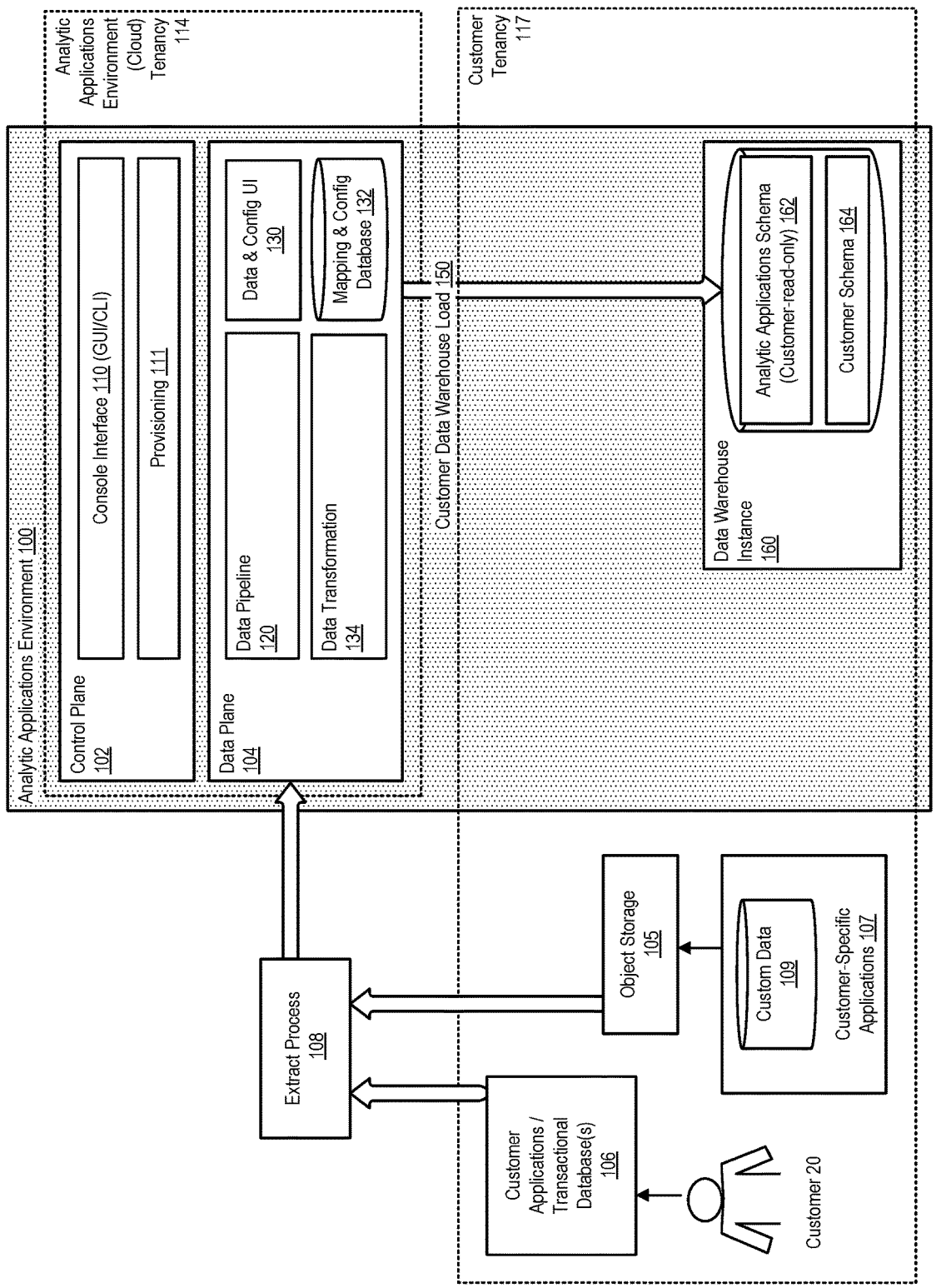
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
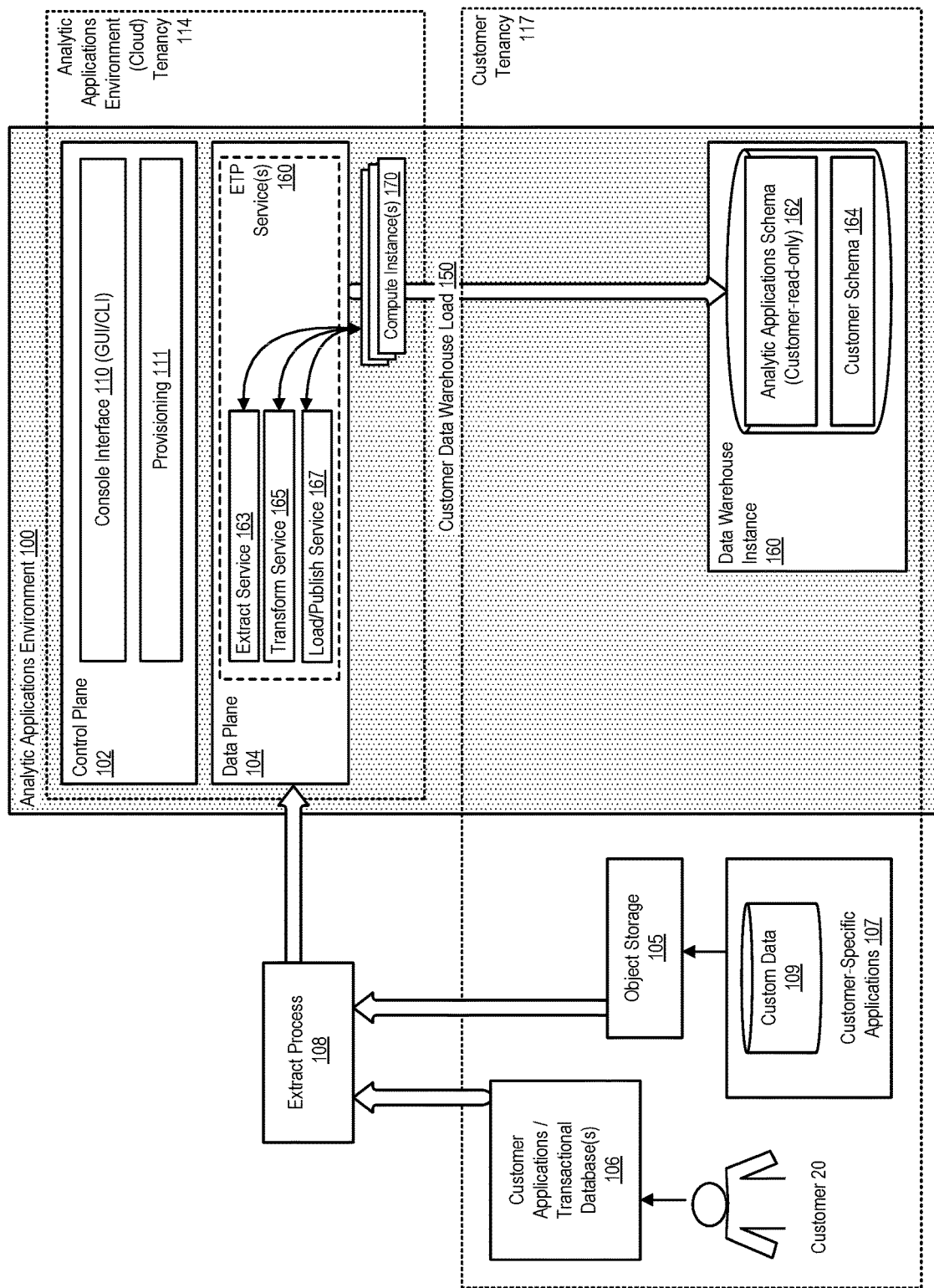
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., IADW warehouse, and publishes it to a data warehouse instance that is accessible to the customer (tenant).

Multiple Customers (Tenants)

Figure 4:
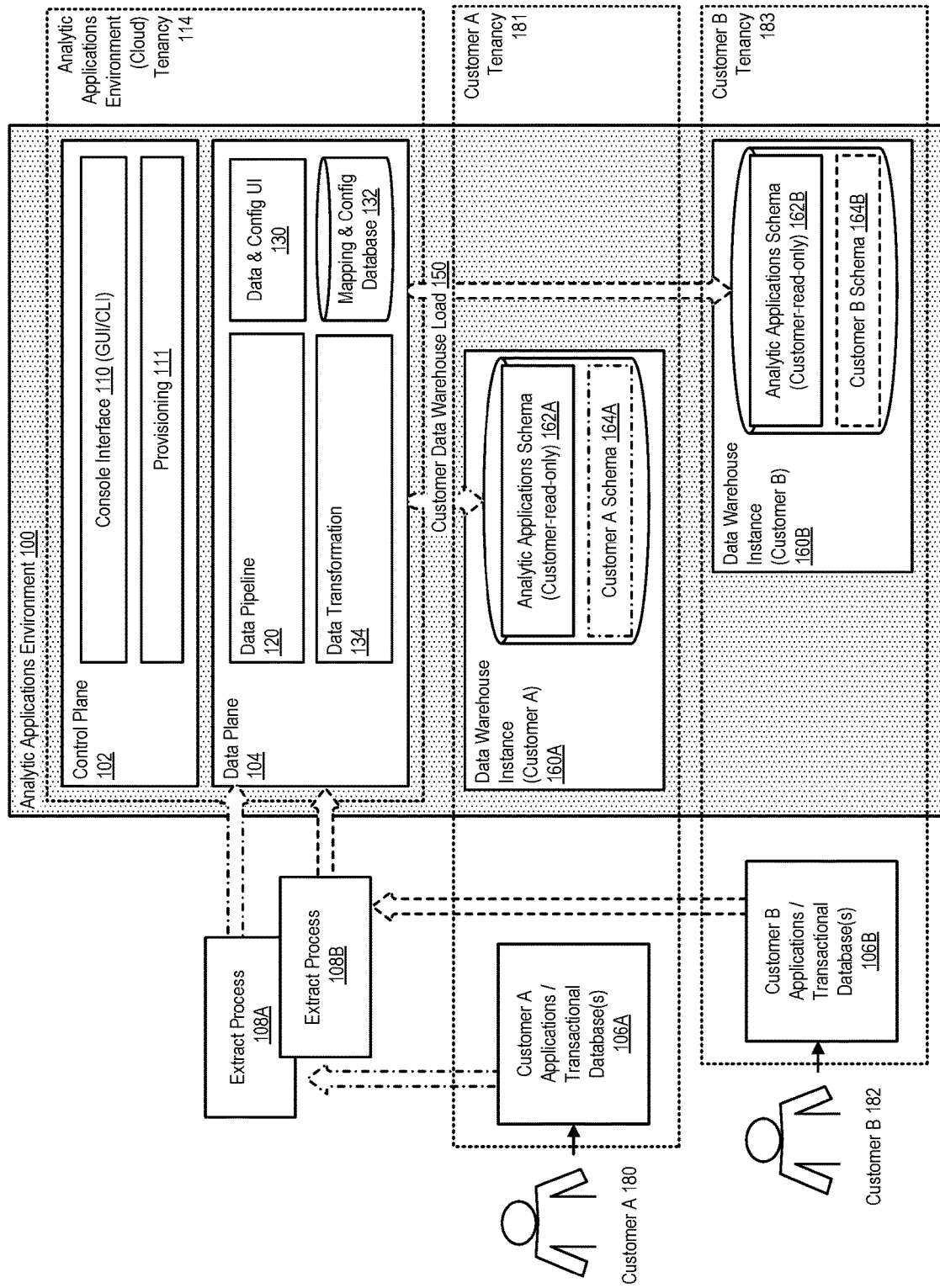
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
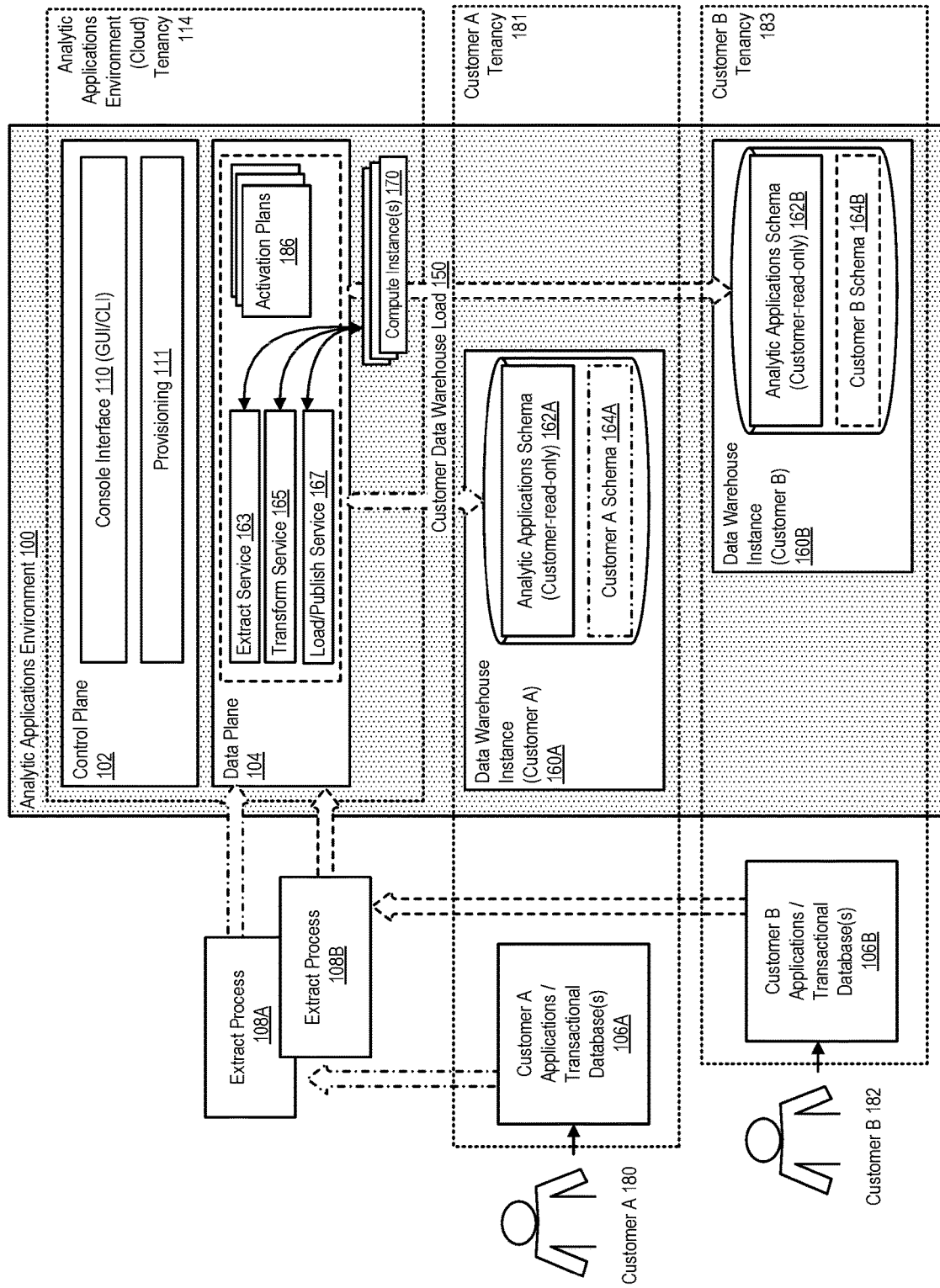
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
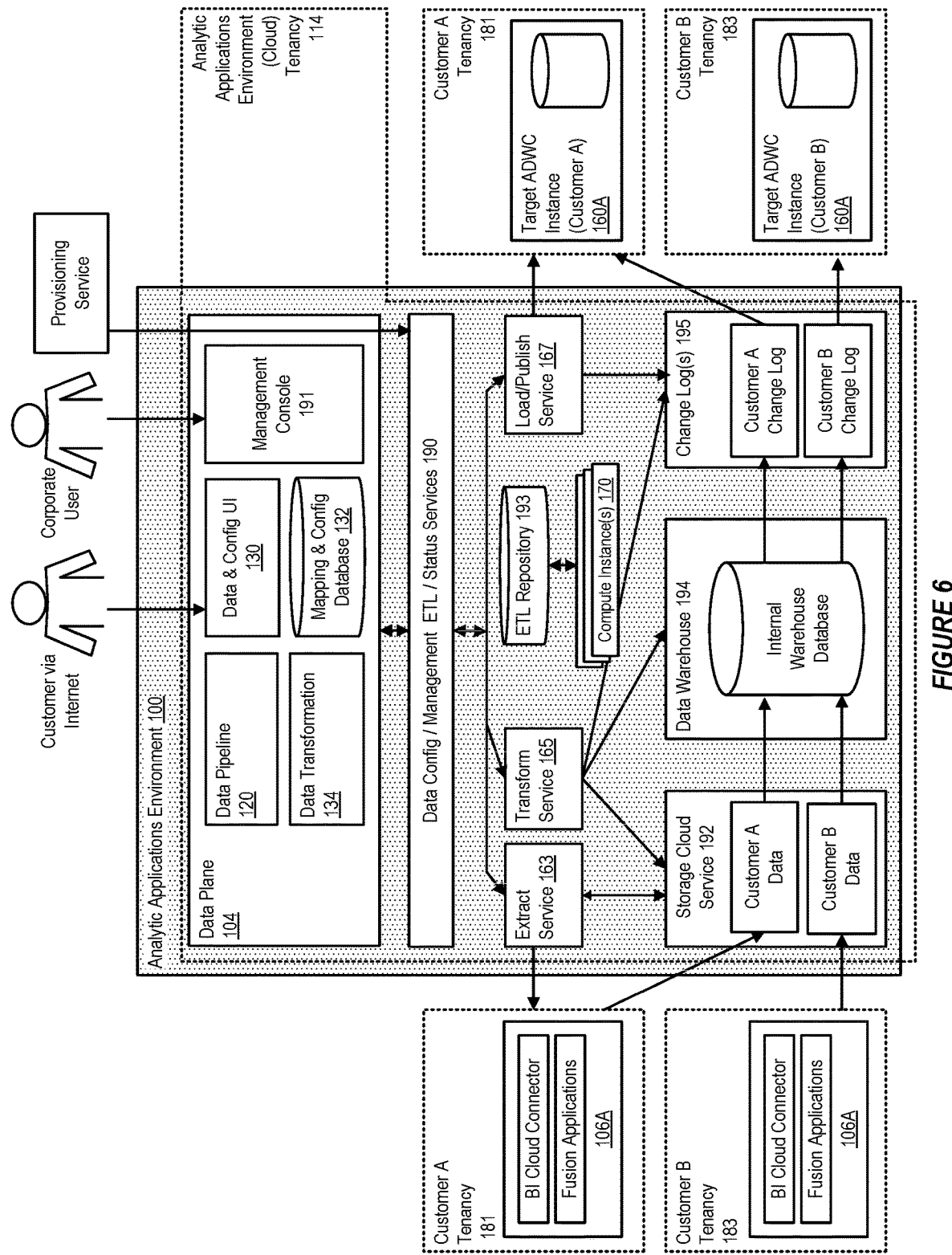
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL// status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., IADW) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
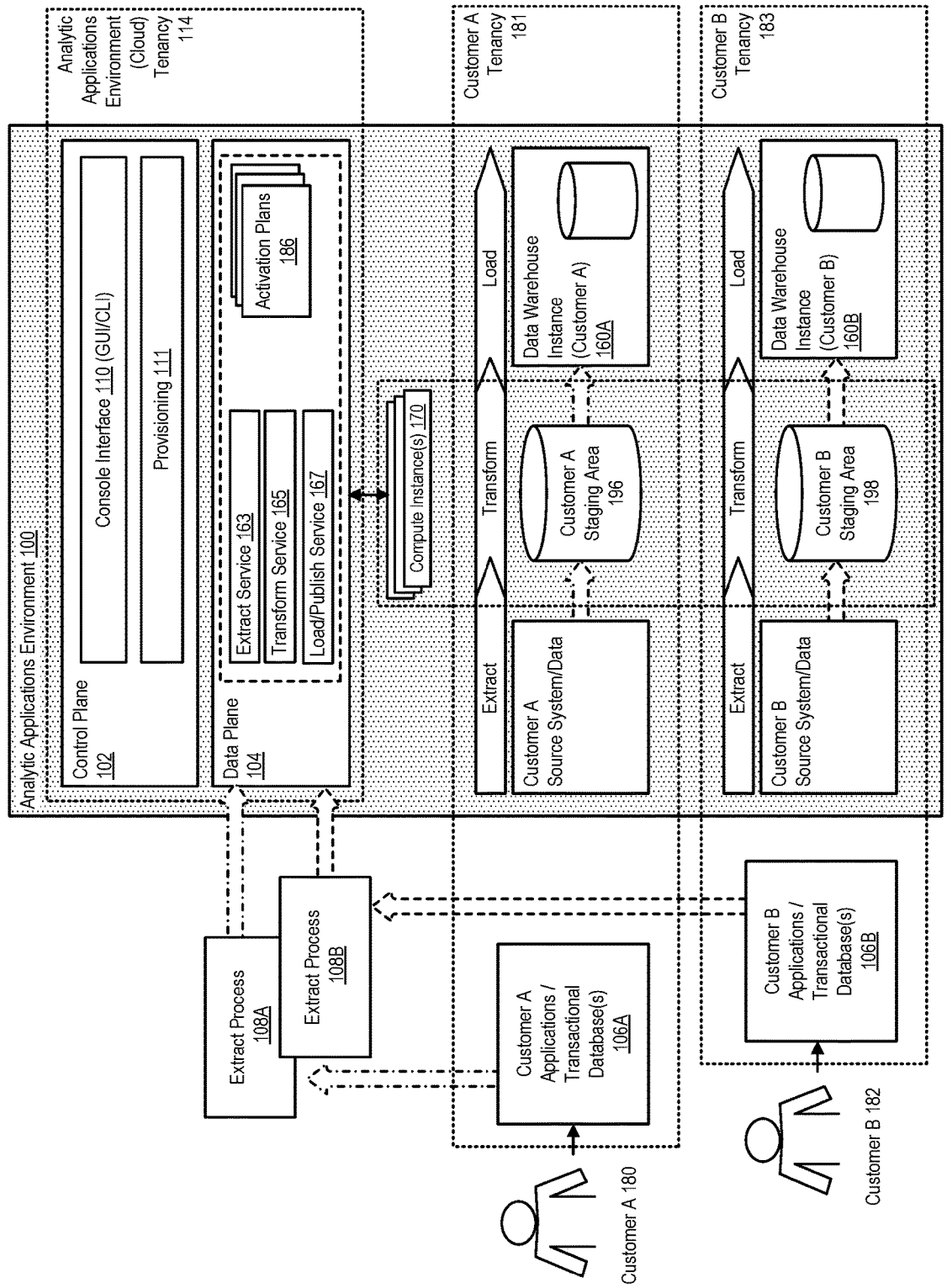
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
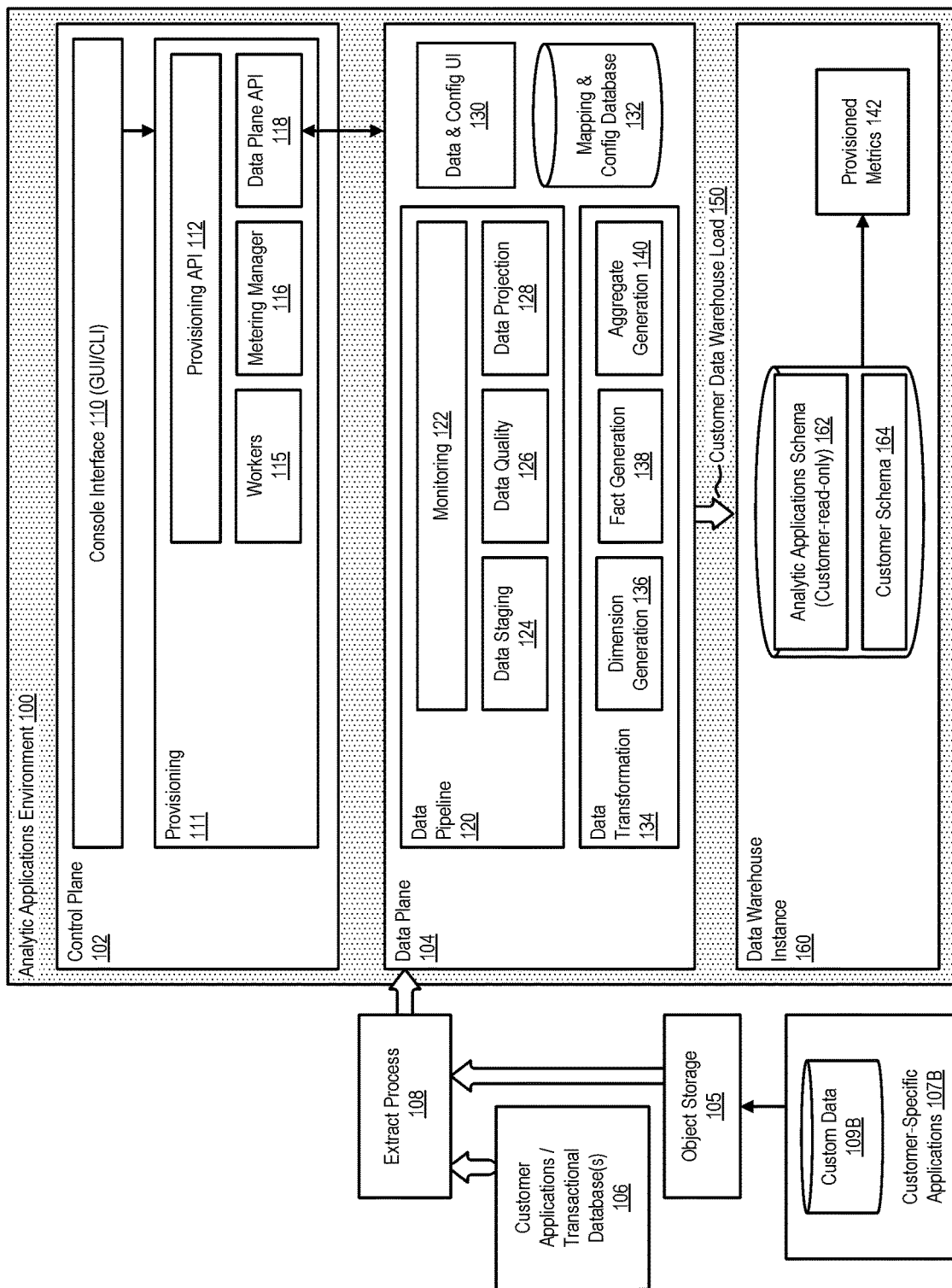
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
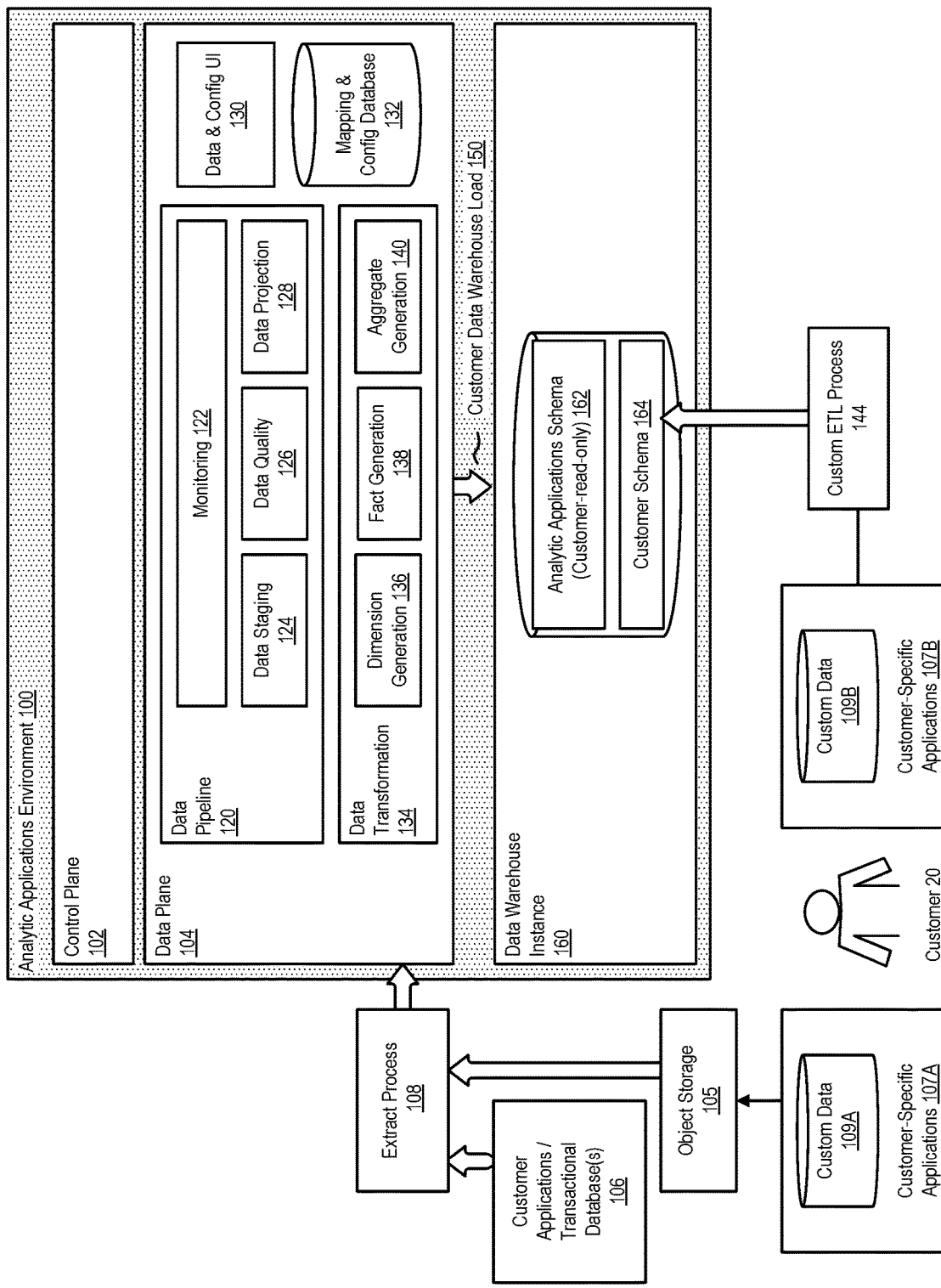
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
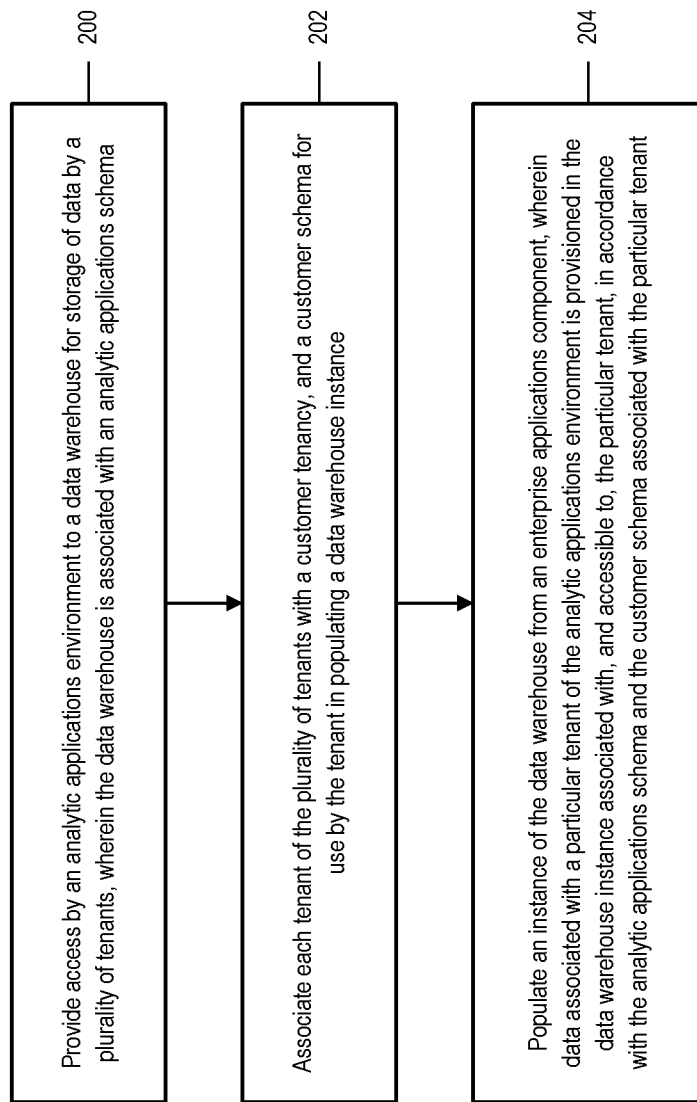
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Ranking of Database Tables for Use with ETL Processes

As described above, a cloud-based computing environment or data warehouse enables extract, transform, load (ETL) processes to be performed for multiple customers, using the shared resources of the cloud or data warehouse environment.

In such environments, the various ETL processes may be associated with customer service level agreements (SLA's) specified for different customers. However, since a customer's data growth may not be linear, or may otherwise vary over time; it can be challenging to ensure that the ETL processing time associated with their data remains within their associated SLA.

In accordance with various embodiments, described herein are systems and methods for use with an analytic applications environment, for ranking of database tables for use in controlling extract, transform, load (ETL) processes.

In accordance with an embodiment, the system uses a ranking algorithm or process to rank database tables and/or table columns associated with a set of data. The table/column rankings can then be used to prioritize ETL processing of a customer's data for use with a data warehouse or other data analytics environment.

In accordance with an embodiment, the method includes determining (a) a global rank; (b) a business rank; and/or (c) a tenant or customer-specific rank, for a plurality of tables and columns in a customer's database; and aggregating or otherwise using the determined rankings to control the ETL process for a particular customer (tenant), to load their data into the data warehouse.

For example, in accordance with an embodiment, during the loading of data from one or more customer data sources to a data warehouse, there may be a need to prepare the data in some manner; for example by extracting the data from a highly-normalized transactional system data source, and transforming it into schemas to support analytic querying and processes.

Typical enterprise transactional databases (e.g., financial databases, ERP, HCM and CRM databases) and enterprise data warehouses contain a large amount of tables. For example, it is not uncommon for an enterprise organization to have several databases, and for each database to have hundreds of tables, and perhaps thousands of columns within those tables.

Each of these tables and columns may not be equally important in terms of the ETL process. For example, some tables may be repositories of a customer's core financial data, and accurately capturing data from these tables relatively early in the ETL process may be very important. Conversely, other tables may contain, e.g., logging information, and accurately capturing data from these tables in the ETL process may be of lesser importance.

In accordance with an embodiment, since the ETL process is a computationally expensive process in terms of the computer resources needed to perform the process with large amounts of data, the ability to prioritize or rank tables by order of importance, prior to performing the ETL process, provides a variety of advantages of benefits, such as, for example:

1. Customers can promptly be provided with ETL data, as part of the ETL process, for their organization's more important tables.
2. As part of the ETL process, the source/target table integrity of highly-ranked (i.e., more important) tables can be prioritized. For example, instead of conventionally checking the integrity of every column in every table, the integrity of the more important columns in the more important tables can be checked first, enabling relatively quick and efficient completion of the ETL process.
3. As part of the ETL process, when the system generates alerts, for example in connection with table data size errors, the alerts can be prioritized by ordering the more important tables first, so that the administrator can correspondingly attend to the more important alerts first.

Figure 11:
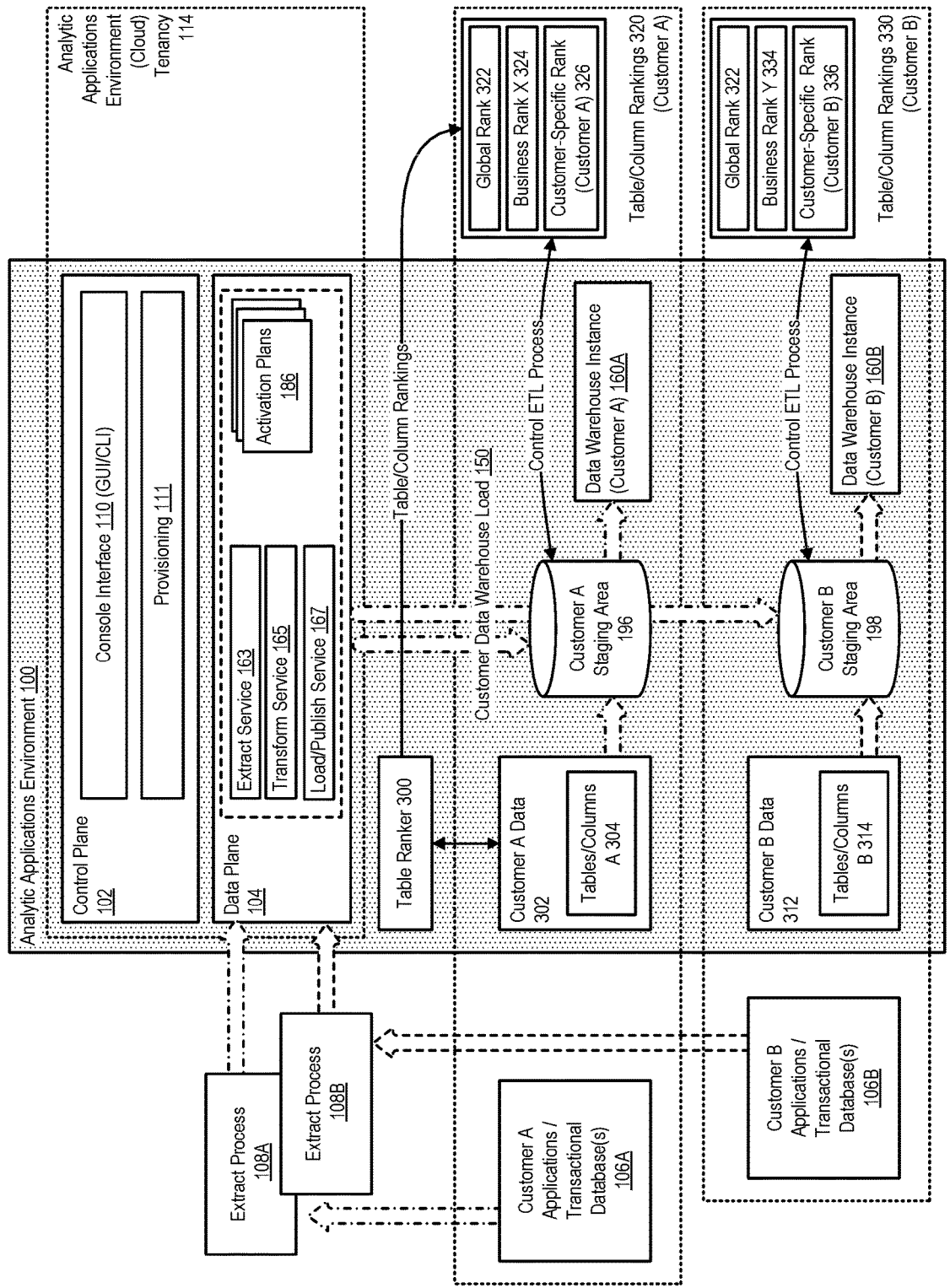
FIG. 11 illustrates a system for ranking of database tables for use in controlling extract, transform, load processes, in accordance with an embodiment.

FIG. 11 illustrates a system for ranking of database tables for use in controlling extract, transform, load processes, in accordance with an embodiment.

As illustrated in FIG. 11, in accordance with an embodiment, the system can include a table ranker 300 component that performs a ranking algorithm or process to rank database tables and/or table columns associated with a set of data.

For example, in accordance with an embodiment, each of a plurality of customers A, B, can be associated with a customer data (e.g., customer A data 302, customer B data 312 respectively), which can include a plurality of database tables/columns (e.g., table/columns A 304, table/columns B 314 respectively).

In accordance with an embodiment, during the processing of a customer's data, for use with the customer's data warehouse instance, the system determines for the tables/columns in the customer data, a table/columns ranking, including for a first customer A, a first table/columns ranking for that particular customer (320); and for a second customer B, a second/different table/columns ranking for that particular customer (330).

For example, in accordance with an embodiment, the table/column rankings can be determined based on or more of: a global rank 322 associated with the tables/columns in the customer data; a business rank 324, 334 associated with the tables/columns in the customer data; and/or a customer-specific rank 326, 336 associated with the tables/columns in the customer data.

In accordance with an embodiment, the ranking algorithm or process can be used by the system to rank the customer's tables and/or table columns, and the assigned rankings can then be used to prioritize the ETL processing of those ranked tables and/or columns. For each customer, the data associated with their enterprise database tables and columns can be processed in accordance with the transform and load processes as generally described above, but in a more-prioritized manner that is appropriate to the customer's data.

In accordance with an embodiment, the ranking algorithm or process can also determine an aggregate table/column ranking computed as a weighted combination of a global rank, a business rank, and/or a customer-specific rank, as described in further detail below.

The labels associated with various rankings as used above are flexible, and in accordance with an embodiment a variety of different or alternate types of rankings can be used. By way of example, a first rank can be determined as a global rank for each table, and can be common for all of a plurality of customers' tables, e.g., as might be provided in a SaaS environment. A second rank can be determined as a business-specific rank that is common to businesses of a particular type. A third rank can be determined as a local rank that is based, for example, on a customer usage of tables and downstream queries, such as for example, BI or analytical queries.

Figure 12:
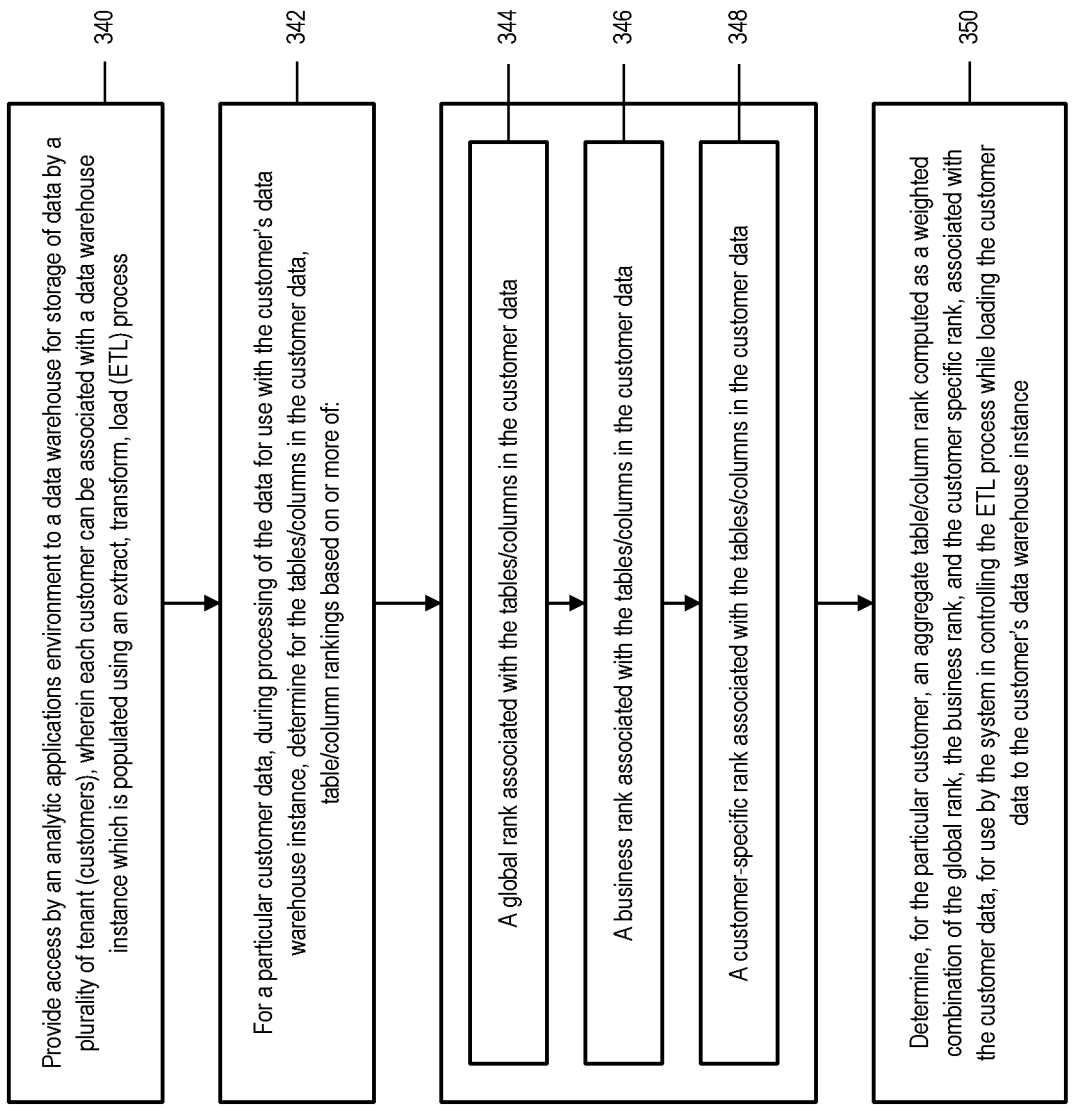
FIG. 12 illustrates a flowchart of a method for ranking of database tables for use in controlling extract, transform, load processes, in accordance with an embodiment.

FIG. 12 illustrates a flowchart of a method for ranking of database tables for use in controlling extract, transform, load processes, in accordance with an embodiment.

As illustrated in FIG. 12, in accordance with an embodiment, at step 340, the system provides access by an analytic applications environment to a data warehouse, for storage of data by a plurality of tenant (customers), wherein each customer can be associated with a data warehouse instance which is populated using an extract, transform, load (ETL) process.

At step 342, for a particular customer data, during processing of the data for use with the customer's data warehouse instance, the system determines, for the tables/columns in the customer data, table/column rankings based on or more of: a global rank associated with the tables/columns in the customer data (step 344); a business rank associated with the tables/columns in the customer data (step 346); and/or a customer-specific rank associated with the tables/columns in the customer data (step 348).

At step 350, the system determines, for the particular customer, an aggregate table/column rank, computed as a weighted combination of the global rank, the business rank, and the customer-specific rank associated with the customer data, for use by the system in controlling the ETL process while loading the customer data to the customer's data warehouse instance.

A. Global Rank for Tables/Columns

As described above, in accordance with an embodiment, table/column rankings can be based on or more of: a global rank associated with the tables/columns in the customer data; a business rank associated with the tables/columns in the customer data; and/or a customer-specific rank associated with the tables/columns in the customer data.

For example, in accordance with an embodiment, a global rank can be determined by the system as a customer-independent rank for each table, and each column in a table.

In accordance with an embodiment, the global rank can be determined based on an understanding that important tables will likely contain important columns of data, and important columns of data will likely be present in important tables. For example, in accordance with an embodiment, the relative importance of a given table or column can be derived for each table or column based on relationships with other important tables or columns and the presence of the same table columns across different tables. This information can then be used to provide a global rank for the tables/columns.

In accordance with an embodiment, the table ranker (ranking process) is adapted to count or otherwise determine how many columns are used across various tables sourced by multiple organizations, to provide a determination as to which are the more important columns in an enterprise-independent way For example, in accordance with an embodiment, the system computes a frequency vectorization of keywords, which can be based on a simple count of keywords, or on a term frequency-inverse document frequency (tf-idf) vectorization, or other appropriate method. In accordance with an embodiment, the tf-idf vectorization can be configured to account for, or penalize, commonly-occurring table names.

By way of example, Table 1 illustrates an example of column importance for a plurality of tables, wherein the count vectorization indicates a number of times a particular column name appears in all of the tables in a database, which can be used as a raw frequency. As further illustrated in the example of Table 1, the tf-idf vectorization provides a normalized number, where the value will be lower for columns holding more important data.

TABLE 1

| Table Column Name | Count Vectorization | Tf-idf Vectorization |
| --- | --- | --- |
| LASTUPDATEDATE | 195 | 29.62 |
| BUSINESSUNITID | 29 | 6.15 |
| LEDGERCURRENCYCODE | 15 | 2.32 |

In accordance with an embodiment, the system can determine a table score indicative of importance, and column score indicative of importance, iteratively, by assessing each measure of importance alternately, until the process converges.

For example, in accordance with an embodiment, the system can determine a table score by summing column score or importance rankings, as generally indicated by:

$$\text{Table Score} = \Sigma_{Column \in Table} \text{Column score}$$

Similarly, in accordance with an embodiment, the system can determine a column score by summing up the table score or importance rankings, as generally indicated by:

$$\text{Column Score} = \Sigma_{Column \in Table} \text{Table score}$$

In accordance with an embodiment, after the process of determining table scores, and column scores, converges, both the resultant table and column scores are obtained, and the process continues to return increasingly more important tables and columns in the database. This determination can then be used to provide the global rank as a customer-independent score or rank for each table, and each column in a table.

B. Business Rank for Tables/Columns

As described above, in accordance with an embodiment, table/column rankings can be based on or more of: a global rank associated with the tables/columns in the customer data; a business rank associated with the tables/columns in the customer data; and/or a customer-specific rank associated with the tables/columns in the customer data.

For example, in accordance with an embodiment, a business rank (referred to herein in some instances as a field rank) can be determined or computed by the system based on information or an understanding as to the nature of a customer's business.

In accordance with an embodiment, such information can be received from, or otherwise determined based on, for example, the customer's historical data stored in, e.g., the data warehouse and/or from the customer's transactional data stored in transactional database tables as may be used by business productivity applications.

In accordance with an embodiment, the system examines various words in these types of tables, which are understood as business-oriented words or terms. For example, in accordance with an embodiment, a business rank for tables and columns can include parsing table names to isolate English language words. By way of example, the table name:

XLACOSTDISTRIBUTIONLINESVPEOGLTRANSFERDATE

Can be parsed and broken down into meaningful constituent words such as "xl," "a," "cost," "distribution," "lines," "vp," "eo," "gl," "transfer," and "date", by the system performing a dynamic programming algorithm or process in combination with, e.g., an English language dictionary or data.

In accordance with an embodiment, the system can use one or more language processing techniques to process (e.g., in the above example, to split) table names into meaningful words or terms. For example, in accordance with an embodiment, the system can use a Latent Dirichlet Allocation (LDA) algorithm or process to extract important topics and words signifying those topics.

By way of example, Table 2 illustrates various topics and constituent words generated by the system in accordance with a particular example. As illustrated in the example, using the above approach, a listed topic 4 may be interpreted by the system to be related to transactions, line items, transaction headers, and to a general ledger of a business. In accordance with an embodiment, topics can be associated with, or determined from, table names, and measures of importance can then be assigned to the table/topic names.

TABLE 2

Topic 0: date update id receipt application type creation cash payment code
Topic 1: expense exp ex date phd code id update parent type
Topic 2: attribute issue ext char pool number base date pe object
Topic 3: dep tree structure statement version code id date update updated
Topic 4: line transaction header fulfill date id tr number code doc In accordance with an embodiment, the system can extract, from the topic words, those words that are considered indicative of the table's importance. For example, words such as "person," "charge," "payment," etc., can be determined to be indicative of a table's importance. The cardinality of these words is indicated as N.

In accordance with an embodiment, the system can determine a count of how often the words appear in the table, and the business rank can be determined by:

$$\text{business rank} = \frac{1}{N} \sum \text{word count}$$

In accordance with an embodiment, Table 3 illustrates an example of determining a business rank for exemplary tables wherein the important words are "person," "charge," "payment," "cost," "violation," and "amount".

For example, as illustrated in Table 3 by way of example, at row 6, the word "cost" is indicated 6 times, and the word "amount" is indicated 7 times—which are indicative of importance. Accordingly, in this example, the system can determine the business rank for the table to be approximately 2.16.

TABLE 3

| tbl_columns | person count | charge count | payment count | cost count | violation count | amount count | business_rank |
|---|---|---|---|---|---|---|---|
| [LASTUPDATEDATE, PARTNERNAM, TPID] | 0 | 0 | 0 | 0 | 0 | 0 | 0.000000 |
| [PERSONID, PERSONPEOLASTUPDATEDATE, PERSONDETA . . . | 12 | 0 | 0 | 0 | 0 | 0 | 2.000000 |
| [APPROVALACTIONHISTORYACTIONDATE, APPROVALACTI . . . | 0 | 0 | 0 | 0 | 0 | 0 | 0.000000 |
| [PROJECTORGANIZATIONID, FUNCTIONNAME] | 0 | 0 | 0 | 0 | 0 | 0 | 0.000000 |
| [CALENDARID, FORECASTFLAG, LASTUPDATEDATE, ORG . . . | 0 | 0 | 0 | 0 | 0 | 0 | 0.000000 |
| [ACCDEPRNADJUSTMENTAMOUNT, ACCELERATEDADJUSTED | 0 | 0 | 0 | 6 | 0 | 7 | 2.166667 |
| [ALGORITHMNAME, ATTRIBUTECATEGORY, ATTRIBUTETECH | 0 | 0 | 0 | 0 | 0 | 0 | 0.000000 |
| [APPLICATIONID, LEDGERID, PARTYSITEID, PARTYTY . . . | 0 | 0 | 0 | 0 | 0 | 0 | 0.000000 |

C. Customer-Specific Rank for Tables/Columns

As described above, in accordance with an embodiment, table/column rankings can be based on or more of: a global rank associated with the tables/columns in the customer data; a business rank associated with the tables/columns in the customer data; and/or a customer-specific rank associated with the tables/columns in the customer data.

For example, in accordance with an embodiment, a customer-specific rank of a table/column can be computed by the system by assessing factors such as the frequency of update of the table and/or column; or how often the table and column is used by downstream applications (e.g., BI processes).

For example, in accordance with an embodiment, if the table or column is used in many SQL queries and downstream reports, then the system can consider this to be an important table or column.

In accordance with an embodiment, the system can determine an importance ranking based on the frequency of update and/or frequency of usage by downstream applications, as generally indicated by:

$$\text{customer specific rank} = \text{frequency of update} * \text{frequency of usage}$$

Aggregate Table/Column Rank

As described above, in accordance with an embodiment, the method includes determining (a) a global rank; (b) a business rank; and (c) a tenant or customer-specific rank, for a plurality of tables and columns in a customer's database; and aggregating or otherwise using the determined rankings to control the ETL process for a particular customer (tenant), to load their data into the data warehouse.

For example, in accordance with an embodiment, an aggregate table/column ranking can be computed as a weighted linear combination of the global rank, the business rank and the customer-specific rank, as generally indicated by:

$$\text{Aggregate Rank} = \alpha * \text{global\_rank} + \beta * \text{business\_rank} + \gamma * \text{customer\_specific\_rank}$$

In accordance with an embodiment, as illustrated above, when computing an aggregate ranking, parameters $\alpha$, $\beta$, and $\gamma$ can indicate the respective weightage for the various ranks, and in some embodiments can be varied for different customers, either using customer inputs or using machine learning. In accordance with an embodiment, such parameters can also be specific for each application in which the ranking is used.

For example, in accordance with an embodiment, if the table/column rankings are used for prioritizing alerts, then the system can solicit customer/user feedback for the alert importance, and can then use that feedback information for further tuning of the $\alpha$, $\beta$, $\gamma$ parameters for use with that particular customer and their data.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments. Additionally, while several of the examples provided herein illustrate determining a number of virtual machines, embodiments can be used to determine a number of other types of compute instances, for use with for use with other types of extract, transform, load or other data pipeline processes.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with an analytic applications environment, for ranking of database tables for use in controlling extract, transform, load (ETL) processes, comprising:
a computer including one or more processors, that includes an analytic applications environment operating theron that provides access to a data warehouse for storage of data by a plurality of tenants, wherein the analytic applications environment includes:
a first warehouse customer tenancy for a first tenant, that comprises a first database instance, a first staging area, and a first data warehouse instance of a plurality of data warehouses or data warehouse instances; and
a second customer tenancy for a second tenant, that comprises a second database instance, a second staging area, and a second data warehouse instance of the plurality of data warehouses or data warehouse instances;
wherein the analytic applications environment includes a data pipeline or other processing component that performs an extract, transform, load (ETL) process to extract data from an enterprise application or database environment, to be loaded into the data warehouse;
wherein the data stored within the data warehouse comprises customer data associated with the plurality of tenants, the customer data including a plurality of database tables and/or table columns, across different tenants of the plurality of tenants, associated with a set of data; and
wherein in association with the ETL process to extract the data from the enterprise application or database environment, to be loaded into the data warehouse, the computer operates as a table ranker that performs a ranking process to rank the database tables and/or table columns associated with the set of data across the plurality of tenants, including:
determining within each tenant's customer data one or more database tables and/or table columns indicative of importance to the tenant, including:
determining, for the first tenant, a first table and/or column ranking associated with a first customer data, for use by the ETL process in loading the first customer data in the first data warehouse instance; and
determining, for the second tenant, a second table and/or column ranking associated with a second customer data, for use by the ETL process in loading the second customer data in the second data warehouse instance;
which first and second table and/or column rankings are used by the analytic applications environment to prioritize processing by the ETL process to extract the tenant's first and second customer data to be loaded into the data warehouse.

2. The system of claim 1, wherein the ranking process includes determining
a global rank;
a business rank; and
a tenant or customer-specific rank, for a plurality of tables and columns in a customer's database; and
aggregating or otherwise using the determined rankings to control the ETL process for a particular customer or tenant, to load their data into the data warehouse.

3. The system of claim 2, wherein the aggregating comprises computing an aggregated ranking as a weighted combination of the global rank, the business rank, and the tenant or customer-specific rank.

4. The system of claim 2, wherein the global rank is a customer- independent rank for each database table, and each column in the database table, and a relative importance of the database table or table column is derived for each database table or table column based on relationships with other important database tables or table columns and having the same table columns across different database tables.

5. The system of claim 2, wherein the one or more processors prioritize database tables based on the global rank using a computed a frequency vectorization of keywords based on a simple count of keywords, or on a term frequency-inverse document frequency (tf-idf) vectorization, wherein the tf-idf vectorization is configured to account for commonly-occurring table names.

6. The system of claim 2, wherein the tenant or customer-specific rank is computed based on assessing factors including a frequency of updates of the database table and/or table column or how often the database table and table column is used by one or more downstream applications.

7. The system of claim 1, wherein the analytic applications environment is provided by a cloud computing environment.

8. The system of claim 1, wherein each tenant of the analytic applications environment is associated with a data warehouse instance associated with a schema for use by the tenant.

9. The system of claim 1, wherein the one or more processors prioritize table columns having a higher importance based on the ranking process, and check the integrity of the prioritized table columns having a higher importance before checking the integrity of other table columns.

10. The system of claim 1, wherein the one or more processors prioritize generation of alerts in connection with one or more database tables having a higher importance based on the ranking process, wherein the alerts correspond to table data size errors.

11. The system of claim 1, wherein the ranking process includes:
(i) determining a plurality of ranks including a global rank, a business rank, and a tenant or customer-specific rank, for the database tables and/or table columns associated with the set of data across the plurality of tenants; and
(ii) aggregating the determined rankings to control the ETL process for a particular customer or tenant, to load the associated data for the customer or tenant into the data warehouse, wherein aggregating the determined rankings comprises:
computing an aggregated ranking as a weighted combination of the global rank, the business rank, and the tenant or customer-specific rank, and
computing the importance of the one or more database tables and/or table columns comprises counting or otherwise determining a number of same table columns used across various different tables sourced by the plurality of tenants, to determine the table columns that are the more important columns in an enterprise-independent way.

12. The system of claim 1,
wherein each of the plurality of tenants, including a first tenant and a second tenant, are associated with a respective customer data, including:
a first customer data associated with the first tenant, and
a second customer data associated with the second tenant,
each of said first customer data and second customer data including a plurality of database tables and/or table columns of data;
wherein the system computes for the database tables and/or table columns in a respective customer data, a table/columns ranking, including:
for the first tenant, a first table/columns ranking of the first customer data associated with the first tenant, and
for the second tenant, a second table/columns ranking of the second customer data associated with the second tenant; and
wherein the system prioritizes ETL processing of the first customer data and the second customer data, for each of the first tenant and the second tenant, according to the rankings computed for the respective database tables and/or table columns.

13. A method for use with an analytic applications environment, for ranking of database tables for use in controlling extract, transform, load (ETL) processes, comprising:
providing, at a computer including one or more processors, an analytic applications environment operating theron that provides access to a data warehouse for storage of data by a plurality of tenants, wherein the analytic applications environment includes:
a first warehouse customer tenancy for a first tenant, that comprises a first database instance, a first staging area, and a first data warehouse instance of a plurality of data warehouses or data warehouse instances; and
a second customer tenancy for a second tenant, that comprises a second database instance, a second staging area, and a second data warehouse instance of the plurality of data warehouses or data warehouse instances;
performing, by the analytic applications environment, an extract, transform, load (ETL) process to extract data from an enterprise application or database environment, to be loaded into the data warehouse, wherein the data stored within the data warehouse comprises customer data associated with the plurality of tenants, the customer data including a plurality of database tables and/or table columns, across different tenants of the plurality of tenants, associated with a set of data; and
in association with the ETL process to extract the data from the enterprise application or database environment, to be loaded into the data warehouse, performing a ranking process to rank the database tables and/or table columns associated with the set of data across the plurality of tenants, including:
determining within each tenant's customer data one or more database tables and/or table columns indicative of importance to the tenant, including:
determining, for the first tenant, a first table and/or column ranking associated with a first customer data, for use by the ETL process in loading the first customer data in the first data warehouse instance; and
determining, for the second tenant, a second table and/or column ranking associated with a second customer data, for use by the ETL process in loading the second customer data in the second data warehouse instance;
which first and second table and/or column rankings are used by the analytic applications environment to prioritize processing by the ETL process to extract the first and second customer data to be loaded into the data warehouse.

14. The method of claim 13, wherein the ranking process includes determining
a global rank;
a business rank; and
a tenant or customer-specific rank, for a plurality of tables and columns in a customer's database; and
aggregating or otherwise using the determined rankings to control the ETL process for a particular customer or tenant, to load their data into the data warehouse.

15. The method of claim 13, wherein the analytic applications environment is provided by a cloud computing environment.

16. The method of claim 13, wherein each tenant of the analytic applications environment is associated with a data warehouse instance associated with a schema for use by the tenant.

17. A non-transitory computer readable storage medium having instructions thereon, which when read and executed by a computer including one or more processors cause the computer to perform a method comprising:
providing, at a computer including one or more processors, an analytic applications environment operating theron that provides access to a data warehouse for storage of data by a plurality of tenants, including wherein
a first warehouse customer tenancy for a first tenant comprises a first database instance, a first staging area, and a first data warehouse instance of a plurality of data warehouses or data warehouse instances;
a second customer tenancy for a second tenant can comprise a second database instance, a second staging area, and a second data warehouse instance of the plurality of data warehouses or data warehouse instances;
performing, by the analytic applications environment, an extract, transform, load (ETL) process to extract data from an enterprise application or database environment, to be loaded into the data warehouse, wherein the data stored within the data warehouse comprises customer data associated with the plurality of tenants, the customer data including a plurality of database tables and/or table columns, across different tenants, including:
determining within each tenant's customer data one or more database tables and/or table columns indicative of importance to the tenant, including:
determining, for the first tenant, a first table and/or column ranking associated with a first customer data, for use by the ETL process in loading the first customer data in the first data warehouse instance; and
determining, for the second tenant, a second table and/or column ranking associated with a second customer data, for use by the ETL process in loading the second customer data in the second data warehouse instance;
which first and second table and/or column rankings are used by the analytic applications environment to prioritize processing by the ETL process to extract the tenant's first and second customer data to be loaded into the data warehouse.

18. The non-transitory computer readable storage medium of claim 17, wherein the ranking process includes determining
a global rank;
a business rank; and
a tenant or customer-specific rank, for a plurality of tables and columns in a customer's database; and
aggregating or otherwise using the determined rankings to control the ETL process for a particular customer or tenant, to load their data into the data warehouse.

19. The non-transitory computer readable storage medium of claim 17, wherein the analytic applications environment is provided by a cloud computing environment.

20. The non-transitory computer readable storage medium of claim 17, wherein each tenant of the analytic applications environment is associated with a data warehouse instance associated with a schema for use by the tenant.

* * * * *

UNITED STATES PATENT AND TRADEMARK OFFICE
CERTIFICATE OF CORRECTION

| | | |
|---|---|---|
| PATENT NO. | : 12,248,490 B2 | Page 1 of 1 |
| APPLICATION NO. | : 17/076164 | |
| DATED | : March 11, 2025 | |
| INVENTOR(S) | : Ramanathan et al. | |

It is certified that error appears in the above-identified patent and that said Letters Patent is hereby corrected as shown below:

On the Title Page

In page 3, Column 2, item (56) under Other Publications, Line 31, delete "Pcs," and insert -- Bcs, --, therefor.

In the Specification

In Column 4, Line 51, delete "organization," and insert -- organization. --, therefor.

In Column 10, Line 17, delete "analytics" and insert -- analytics, --, therefor.

In Column 16, Line 62, delete "way" and insert -- way. --, therefor.

In the Claims

In Column 21, Line 64, in Claim 1, after "the" delete "tenant's".

In Column 21, Line 17, in Claim 1, delete "theron" and insert -- thereon --, therefor.

In Column 22, Line 13, in Claim 4, delete "customer- independent" and insert -- customer-independent --, therefor.

In Column 23, Line 32, in Claim 13, delete "theron" and insert -- thereon --, therefor.

In Column 24, Line 33, in Claim 17, delete "theron" and insert -- thereon --, therefor.

In Column 25, Line 2, in Claim 17, after "the" delete "tenant's".

Signed and Sealed this
Third Day of June, 2025

Coke Morgan Stewart
*Acting Director of the United States Patent and Trademark Office*